Dec. 31, 1946.    J. C. OLDFIELD    2,413,647
WATERING DEVICE
Filed June 27, 1944
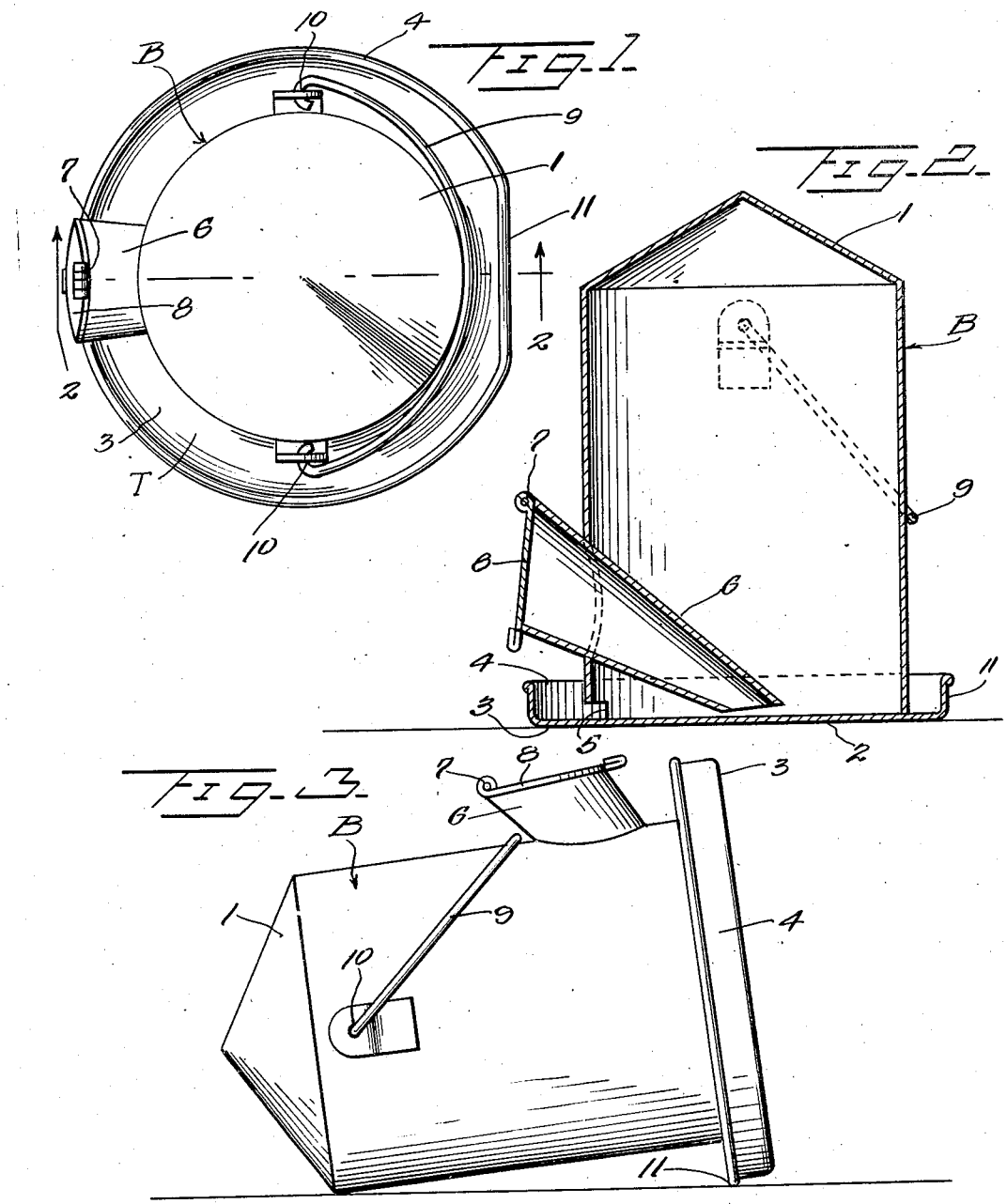
Inventor
John C. Oldfield
By Wilfred E. Lawson
Attorney Patented Dec. 31, 1946

2,413,647

UNITED STATES PATENT OFFICE 2,413,647

WATERING DEVICE

John C. Oldfield, Yakima, Wash.

Application June 27, 1944, Serial No. 542,337

2 Claims. (Cl. 119—77)

This invention relates to watering devices and has relation more particularly to a device of this kind of a barometric type, and it is an object of the invention to provide such a device constructed in a manner whereby it can be readily and conveniently refilled.

The invention also has for an object to provide a watering device including a filler tube which extends inwardly and downwardly of the body or tank of the device and terminates closely adjacent to the central portion of the bottom of the body or tank and wherein the side wall of the tank substantially below the outer or induction end of the filler tube is provided with an outlet opening.

A still further object of the invention is to provide a device of this kind including a body or tank having a discharge opening in its bottom portion together with a filler tube extending within the body or tank in a manner whereby the body or tank may be substantially completely filled when the body or tank is horizontally disposed and wherein the lower portion of the body or tank is surrounded by a trough into which the discharge opening delivers, said trough having its outer wall extending above the discharge opening of the body or tank, the liquid within the trough being maintained at a constant level.

The invention consists in the details of construction and in the combination and arrangement of the several parts of my improved watering device whereby certain important advantages are attained, as will be hereinafter more fully set forth.

In order that my invention may be better understood, I will now proceed to describe the same with reference to the accompanying drawing, wherein:

Figure 1 is a view in top plan of a watering device constructed in accordance with an embodiment of the invention;

Figure 2 is a vertical sectional view taken substantially on the line 2—2 of Figure 1; and Figure 3 is an elevational view of the device in substantially a horizontal or filling position.

In the embodiment of the invention as illustrated in the accompanying drawing, the watering device comprises a body or tank B of desired dimensions and capacity and which is herein shown as cylindrical in form. The top of the body or tank B is closed by a conical top 1. The bottom 2 of the body or tank extends outwardly, as at 3, beyond and around the body or tank B and has its outer marginal portion defined by an upstanding continuous flange 4 whereby is provided a drinking trough T.

The peripheral wall of the body or tank B immediately adjacent to the bottom 2 is provided with a discharge opening 5. In the present embodiment of the invention this opening 5 is rectangular in form and of a height to terminate below the upper edge of the flange 4 of the trough T so that the liquid level within the trough T will be constant.

The wall of the body or tank B has disposed therethrough at a point directly above the discharge opening 5 a downwardly and inwardly inclined filling tube 6. This tube 6 decreases in diameter from the outer end to its inner or inserted end and said tube 6 is of a length to extend a material distance outwardly of the body or tank B and to have its inner end terminate closely adjacent to the central portion of the bottom 2 of the body or tank B.

Hingedly connected, as at 7, with the upper portion of the filler tube 6 at the outer extremity thereof is a freely swinging flap valve 8 which, when in its lowermost position, effectually closes the tube 6 to prevent dirt or other foreign matter passing through the tube 6 into the body or tank B.

When the body or tank B is in substantially a horizontal position with the outer end of the tube 6 and the opening 5 upwardly directed, the body or tank B can be substantially entirely filled by water or other liquid poured through the tube 6. After the filling of the body or tank B, the same will then be turned to upright position and be ready for use.

To facilitate the desired handling of the device, the upper portion of the body or tank B has associated therewith a bale 9, the extremities of which being pivotally connected, as at 10, to the peripheral wall of the body or tank B at diametrically opposed points and with such pivots aligned in a direction substantially at right angles to a plane of the opening 5 and the outer or induction end of the tube 6.

The bale 9 straddles the upper portion of the body or tank B and it is to be further pointed out that the pivots 10 are aligned in a direction substantially radial of the body or tank B. This mounting of the bale 9 assures the same to be in the most effective position for manipulating the device and more particularly in returning the device from horizontal to vertical position.

The flange 4 of the trough T at a point remote from and diametrically opposed to the opening 5, or the rear portion of the trough T as it may be called, is formed to provide a straight or flattened portion 11 which provides means for holding the body or tank B against turning movement when said body or tank B is in substantially a horizontal position with the opening 3 and filling tube 6 upwardly disposed. This straight or flattened portion 11 constitutes a fulcrum to facilitate the desired lowering and raising of the device.

It is to be pointed out that the device as herein disclosed is one that can be easily cleansed as water and pebbles or disinfectants may be freely poured therein and flow out therefrom.

It is to be noted that aside from the opening 5 and the filling tube 6, the body or tank B is hermetically closed.

From the foregoing description it is thought to be obvious that a watering device constructed in accordance with my invention is particularly well adapted for use by reason of the convenience and facility with which it may be assembled and operated.

I claim:

1. A watering trough comprising a tank body having a closed top, a vertical side wall and a bottom, said bottom being extended outwardly beyond the tank side wall and merging with an upstanding flange wall spaced from the tank side wall and completely encircling the latter, the tank side wall and said flange wall forming a drinking trough, an outlet opening formed in the bottom edge of the tank side wall and having a height less than the height of said flange wall, and means for filling the tank comprising a relatively long tubular body open at both ends and of gradually decreasing diameter from one end to the other, the tubular body being extended through the tank side wall above said opening at an upward and outward inclination with respect to the plane of the bottom wall, the smaller end of the tubular body terminating closely adjacent to the top of the bottom wall at the center of the tank and the larger end of the tubular body terminating outside the tank in spaced relation with the tank side wall, and a cover plate hingedly attached to the outer end of the tubular body at the top thereof and adapted to swing by gravity to closed position over the outer end of the tubular body.

2. A watering trough of the character stated in claim 1, wherein a portion of the bottom wall diametrically opposite from said opening and from the filling means, and the flange wall integral with such portion, is formed straight to provide a supporting base when the tank is disposed upon its side for filling, the said straight portion of the flange wall being spaced from the tank side wall whereby the trough remains of unbroken continuity around the tank.

JOHN C. OLDFIELD.